United States Patent
Genin et al.

(10) Patent No.: US 11,635,511 B2
(45) Date of Patent: Apr. 25, 2023

(54) METHOD AND SYSTEM FOR DETERMINING A CHARACTERISTIC DIMENSION OF A SHIP

(71) Applicant: THALES, Courbevoie (FR)

(72) Inventors: Jean-Baptiste Genin, Elancourt (FR); Luc Bosser, Elancourt (FR); Joan Broussolle, Elancourt (FR)

(73) Assignee: THALES, Courbevoie (FR)

( * ) Notice: Subject to any disclaimer, the term of this patent is extended or adjusted under 35 U.S.C. 154(b) by 745 days.

(21) Appl. No.: 16/427,512

(22) Filed: May 31, 2019

(65) Prior Publication Data

US 2019/0369231 A1    Dec. 5, 2019

(30) Foreign Application Priority Data

Jun. 1, 2018    (FR) ..................... 18 00545

(51) Int. Cl.
    *G01S 13/90*    (2006.01)
    *G01S 7/41*    (2006.01)
(52) U.S. Cl.
    CPC ............ *G01S 13/9029* (2013.01); *G01S 7/41* (2013.01)
(58) Field of Classification Search
    CPC .... G01S 13/9029; G01S 7/41; G01S 13/9027; G01S 13/9023; G01S 7/411
    USPC ......................................................... 342/27
    See application file for complete search history.

(56) References Cited

U.S. PATENT DOCUMENTS

| 4,719,467 | A | | 1/1988 | Voles |
| 5,497,158 | A | * | 3/1996 | Schmid ............... G01S 13/9027 342/90 |
| 6,184,981 | B1 | * | 2/2001 | Hasson .................. G01S 13/10 356/303 |

(Continued)

FOREIGN PATENT DOCUMENTS

| CN | 101551457 B | * | 5/2012 | |
| CN | 104050716 A | * | 9/2014 | |
| CN | 104517124 B | * | 3/2018 | ........... G06K 9/4671 |

(Continued)

OTHER PUBLICATIONS

Lu et al., "A Target Detection Method in Range-Doppler Domain from SAR Echo Data", Pattern Recognition, Proceedings 16th International Conference on Quebec City, 2002, pp. 91-94, XP010613282.

(Continued)

*Primary Examiner* — Vladimir Magloire
*Assistant Examiner* — Alexander L. Syrkin
(74) *Attorney, Agent, or Firm* — Nixon & Vanderhye

(57) ABSTRACT

Disclosed is a method for determining a dimension of a ship, the method being implemented by an electronic system with a radar device having two receiving channels. The method includes: acquiring, for each of the two receiving channels of the radar device, a synthetic aperture radar image imaging the ship in an environment; the sum of the respective amplitudes of the pixels of the two radar images to obtain a sum image; extracting pixels from the sum image imaging the ship to obtain a mask of the ship; determining a range of phase differences between the radar signals received by each of the two receiving channels; and determining a dimension of the ship as a function of the mask of the ship and the determined phase difference range.

10 Claims, 4 Drawing Sheets

(56) References Cited

U.S. PATENT DOCUMENTS

2015/0268340 A1* 9/2015 Bruyere .............. G01S 13/9023
                                                            342/25 C
2018/0052229 A1* 2/2018 Ranney ................ G01S 13/867

FOREIGN PATENT DOCUMENTS

| GB | 2189962 A | 11/1987 | | |
|---|---|---|---|---|
| GB | 2541658 A | * | 3/2017 | ........... G01S 13/867 |
| RU | 2278397 C2 | * | 6/2006 | |
| WO | WO-2007113469 A1 | * | 10/2007 | ......... G01S 13/9029 |

OTHER PUBLICATIONS

Greidanus, Satellite Imaging for Maritime Surveillance of the European Seas, Remote Sensing of the European Seas, 2008, pp. 343-358, XP 002514546.
Kostis et al., "Interferometric Inverse Synthetic Aperture Radar (InISAR)", London Communications Symposium 2005, 2005, XP055083892.
FR Search Report, dated Mar. 20, 2019, from corresponding FR application No. 1800545.

* cited by examiner

METHOD AND SYSTEM FOR DETERMINING A CHARACTERISTIC DIMENSION OF A SHIP

CROSS-REFERENCE

This claims the benefit of the French Patent Application FR 18/00 545, filed Jun. 1, 2018 and hereby incorporated by reference herein.

FIELD OF THE INVENTION

The present invention relates to a method for determining at least one characteristic dimension of a ship. The present invention also relates to an associated system for determining at least one characteristic dimension of a ship. The present invention also relates to an aircraft comprising such a determining system.

BACKGROUND OF THE INVENTION

The technical field is that of radar imaging of maritime targets, such as ships. Radar imaging makes it possible to obtain images representative of the elementary reflectors of ships. Radar imaging is based on the processing of backscattering signals from the object to be observed and recorded by a coherent radar device.

In particular, SAR (Synthetic Aperture Radar) imaging is a radar imaging technique making it possible to provide overhead views of ships. An SAR image shows the reflectors of the ship seen by the radar device as a function of the distance of said reflectors relative to the radar device and the Doppler frequency of the radar signal reflected on said reflectors.

More specifically, an SAR image is a matrix I(x, y) of pixels. Each pixel has an amplitude corresponding to the power reflected by a reflector, and coordinates (x,y). Each column (x-axis) of the matrix of pixels corresponds to a distance between a reflector and the radar device. Thus, the x-axis of the SAR image, also called distance axis, is a depiction of the viewing direction between a reflector and the radar device during the acquisition of the SAR image. Each row (y-axis) of the matrix of pixels corresponds to a frequency shift caused by the Doppler effect and indicative of a relative speed between the reflector and the radar device. Thus, the y-axis of the SAR image, also called Doppler axis, is a depiction of the relative speed between the reflector and the radar device. The distance and frequency shift properties being sampled with predetermined pitches, we will respectively refer to distance box and Doppler box for each coordinate of a pixel.

The SAR images are in particular used for maritime surveillance radar imaging with the aim of extracting a signature of the ship allowing classification, or even recognition of the ship. In particular, SAR images are used to determine characteristic dimensions of ships, such as the length or width of ships.

In order to obtain such characteristic dimensions of ships, it is appropriate to determine, on the one hand, the relationship between the distance boxes and the distance between a reflector and the radar device, and on the other hand, the relationship between the Doppler boxes and the distance between the reflector and the viewing direction. The relationship for the distance boxes is known because the temporal sampling on the distance axis corresponds to a distance sampling. The relationship for the Doppler boxes depends on the angular scrolling between the radar device and the imaged point between the beginning and the end of acquisition.

In the case of field imaging, illustrated in FIG. 1, the reflectors of the ship are stationary and only the radar device carried by an aircraft moves by an angle α relative to the ship. In this case, the relationship for the Doppler boxes is known, which makes it possible to deduce reliable dimensions of the ship therefrom.

Nevertheless, in the case of the imaging of maritime targets, the angular scrolling of the reflectors, which is typically the result of the movement of the radar detector, generally has another contribution, namely the movement specific to the imaged ship. For example, in the example illustrated by FIG. 2, the ship is further affected by a yaw movement β during the acquisition. Thus, added to the angular scrolling α generated by the movement of the radar device is the angular scrolling β generated by the movement of the ship. The yaw speed of the ship not being known, the relationship for the Doppler boxes is therefore not controlled and the determined dimensions of the ship may present non-negligible errors.

There is therefore a need for a method making it possible to reliably determine the characteristic dimensions of a ship, such as the length or the width of the ship, independently of any movements of said ship.

SUMMARY OF THE INVENTION

To that end, the invention relates to a method for determining at least one characteristic dimension of a ship, such as the length or the width of the ship, the method being implemented by an electronic system, the electronic system comprising a radar device and a calculator, the radar device comprising at least two separate channels for receiving a radar signal, the method comprising the following steps:

acquiring, for each of the two receiving channels of the radar device, a synthetic aperture radar image imaging the ship in an environment, the two radar images resulting from radar signals coming from a same radar emission signal and respectively received by each of the two receiving channels of the radar device, each radar image being a matrix of pixels, each pixel having an amplitude and coordinates called distance box and Doppler box, the sum of the respective amplitudes of the pixels of the two radar images to obtain a sum image, extracting pixels from the sum image imaging the ship to obtain a mask of the ship, determining a range of phase differences between the radar signals received by each of the two receiving channels, and determining a characteristic dimension of the ship as a function of the mask of the ship and the determined range of phase differences.

According to other advantageous aspects of the invention, the determination method comprises one or more of the following features, considered alone or according to all technically possible combinations:

the radar device has a geometry, the two radar images being acquired at a sampling frequency, at a viewing distance and in a viewing direction, the step for determining a characteristic dimension comprising:

a sub-step for determining a transverse dimension of the ship in a transverse direction as a function of the mask of the ship, the determined range of phase differences, the viewing distance and the geometry of the radar device, the transverse direction being a direction orthogonal to the viewing direction, a sub-step for determining a radial dimension of the ship in a radial direction as a function of the mask of the ship, and the sampling frequency, the radial direction being the viewing direction, and a sub-step for determining the characteristic dimension as a function of the determined radial dimension and transverse dimension;

the sub-step for determining a transverse dimension of the ship comprises:

calculating an angular extension corresponding to the range of phase differences determined as a function of the geometry of the radar device and the determined range of phase differences, and calculating the transverse dimension as a function of the calculated angular extension and the viewing direction;

the step for determining the range of phase differences comprises:

a sub-step for calculating, for each set of pixels of the mask having the same Doppler box, an intermediate phase difference as a function of the radar signals received by each of the two receiving channels and corresponding to the pixels of said set, and a sub-step for obtaining the range of phase differences as a function of the calculated intermediate phase differences.

for each set of pixels of the mask having the same Doppler box, the calculation of the intermediate phase difference comprises:

calculating, for each pixel of the set, the product of the signal received on the first receiving channel and corresponding to said pixel by the conjugate of the signal received on the second receiving channel and corresponding to said pixel, calculating the sum of the calculated products, the intermediate phase difference for said set being the argument of the calculated sum;

the step for determining the range of phase differences comprises a sub-step for calculating a linear regression of the intermediate phase differences relative to the Doppler boxes of the mask;

the calculation of the intermediate phase differences further comprises, for each set of pixels of the mask having the same Doppler box, calculating the modulus of the calculated sum, the intermediate phase differences used to calculate the linear regression being weighted by the corresponding calculated moduli;

the step for determining the range of phase differences also comprises:

a sub-step for calculating the deviation between each intermediate phase difference and the projection of said intermediate phase difference on the line derived from the calculated linear regression, and a sub-step for eliminating intermediate phase differences whose calculated deviations are strictly above a threshold, the sub-steps for calculating a linear regression, calculating deviations and elimination being repeated for the remaining intermediate phase difference values, the range of phase differences being obtained as a function of the slope of the last calculated linear regression.

The invention further relates to a system for determining at least one characteristic dimension of a ship, such as the length or the width of the ship, the electronic system comprising a radar device and a calculator, the radar device comprising at least two separate channels for receiving a radar signal, the electronic system being able to implement a determining method as previously described.

The invention also relates to an aircraft comprising an electronic determining system as previously described.

BRIEF DESCRIPTION OF THE DRAWINGS

Other features and advantages of the invention will appear upon reading the following description of embodiments of the invention, provided solely as an example and done in reference to the drawings, which are.

DETAILED DESCRIPTION OF PREFERRED EMBODIMENTS

Figure 1:
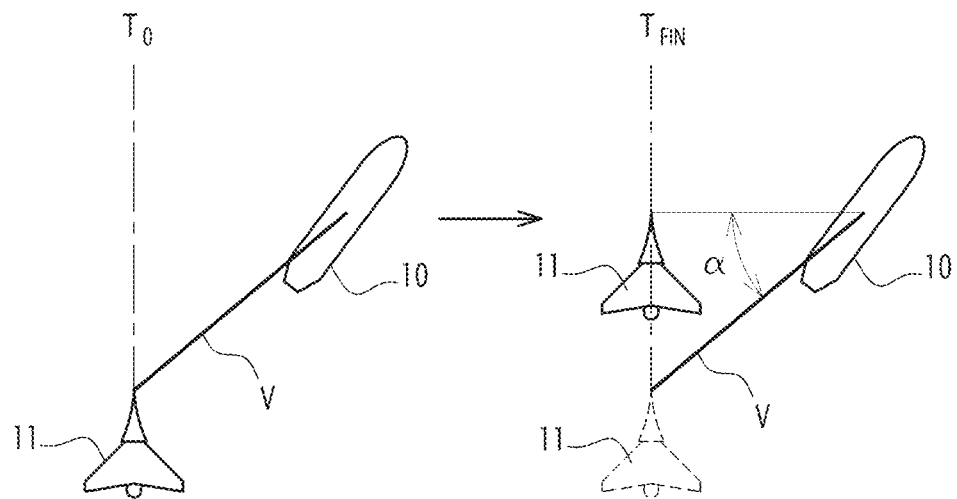
FIG. 1, a schematic illustration of an example of an aircraft moving relative to an immobile ship, FIG. 2, a schematic illustration of an example of an aircraft moving relative to a ship having a yaw movement, FIG. 3, a schematic overhead view of a situation in which an electronic system on board an aircraft determines a characteristic dimension of a ship, FIG. 4, a schematic illustration of an example of the electronic system of FIG. 3, FIG. 5, a flowchart of one example embodiment of a determining method according to the invention, FIG. 6, a schematic illustration of an example of a linear regression of the intermediate phase differences relative to the Doppler boxes of the mask of the ship, and FIG. 7, a schematic illustration of an example of an angular extension corresponding to a phase difference range.
Figure 2:
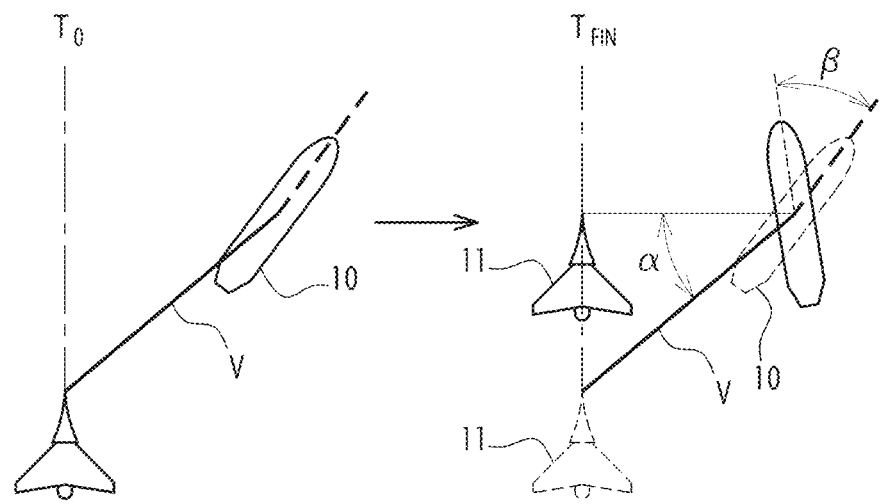
Figure 3:
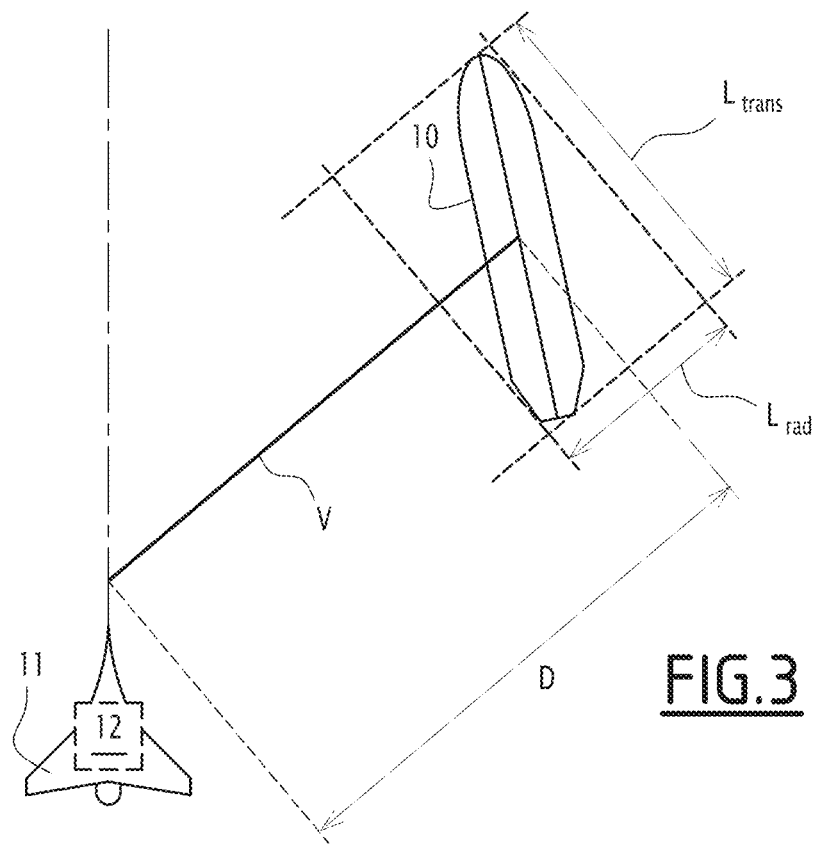

A ship 10 and an aircraft 11 are illustrated by FIG. 3.

The ship 10 comprises reflectors capable of reflecting a radar signal. The reflectors of the ship 10 are for example the hull of the ship 10, the superstructures of the ship 10, such as the bridge, the crane(s) or the mast of the ship 10, or the safety rails of the ship 10.

The characteristic dimensions of the ship 10 are for example the length of the ship 10, the width of the ship 10, the distance between the mast of the ship 10 and the bow of the ship 10 or the length of the bridge of the ship 10.

The aircraft 11 comprises an electronic system 12 for determining at least one characteristic dimension of the ship 10.

The electronic system 12 is configured to drive the implementation of a method for determining at least one characteristic dimension of the ship 10.

Figure 4:
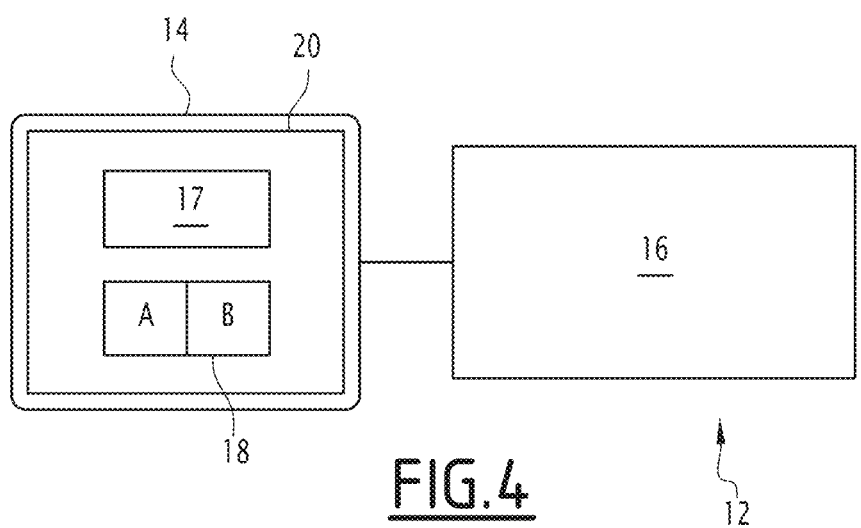

In the example illustrated by FIG. 4, the electronic system 12 comprises a radar device 14 and a calculator 16.

In the example illustrated by FIG. 4, the radar device 14 comprises at least one transmitter 17 of a radar signal and at least one receiver 18 of the radar signal reflected on reflectors. The receiver 18 comprises at least two separate channels A, B for receiving a radar signal. The transmitter 17 and the receiver 18 of the radar device 14 then form an antenna 20.

The radar device 14 has a geometry. In the example illustrated by FIG. 4, the geometry of the radar device 14 is defined as a function of the dimensions and the shape of the antenna 20 of the radar device 14. For example, the antenna 20 has a square shape.

The calculator 16 is for example a computer. The calculator 16 for example comprises a data processing unit, memories, an information medium reader and a man-machine interface, such as a keyboard or a display.

In the example illustrated by FIG. 4, the electronic system 12 is carried by an aircraft 11.

In a variant, only the radar device 14 is carried by the aircraft 11 and the calculator 16 is installed in an entity that is, for example, on the ground. This makes it possible to offload the processing of the images acquired via the radar device 14 outside the aircraft 11.

Advantageously, when the calculator 16 is offloaded from the radar device 14, one skilled in the art will understand that the processing unit of the calculator 16 is able to interact with a computer program product suitable for driving the implementation of a method for determining at least one characteristic dimension of the ship 10. In this case, the computer program product includes a readable information medium on which the computer program is stored.

One skilled in the art will also understand that the radar device 14 and/or the calculator 16 are suitable for being on board in carriers other than the aircraft 11 as long as said carriers allow the radar device 14 to acquire synthetic aperture radar images of the ship 10. For example, the radar device 14 and/or the calculator 16 are on board a drone.

Figure 5:
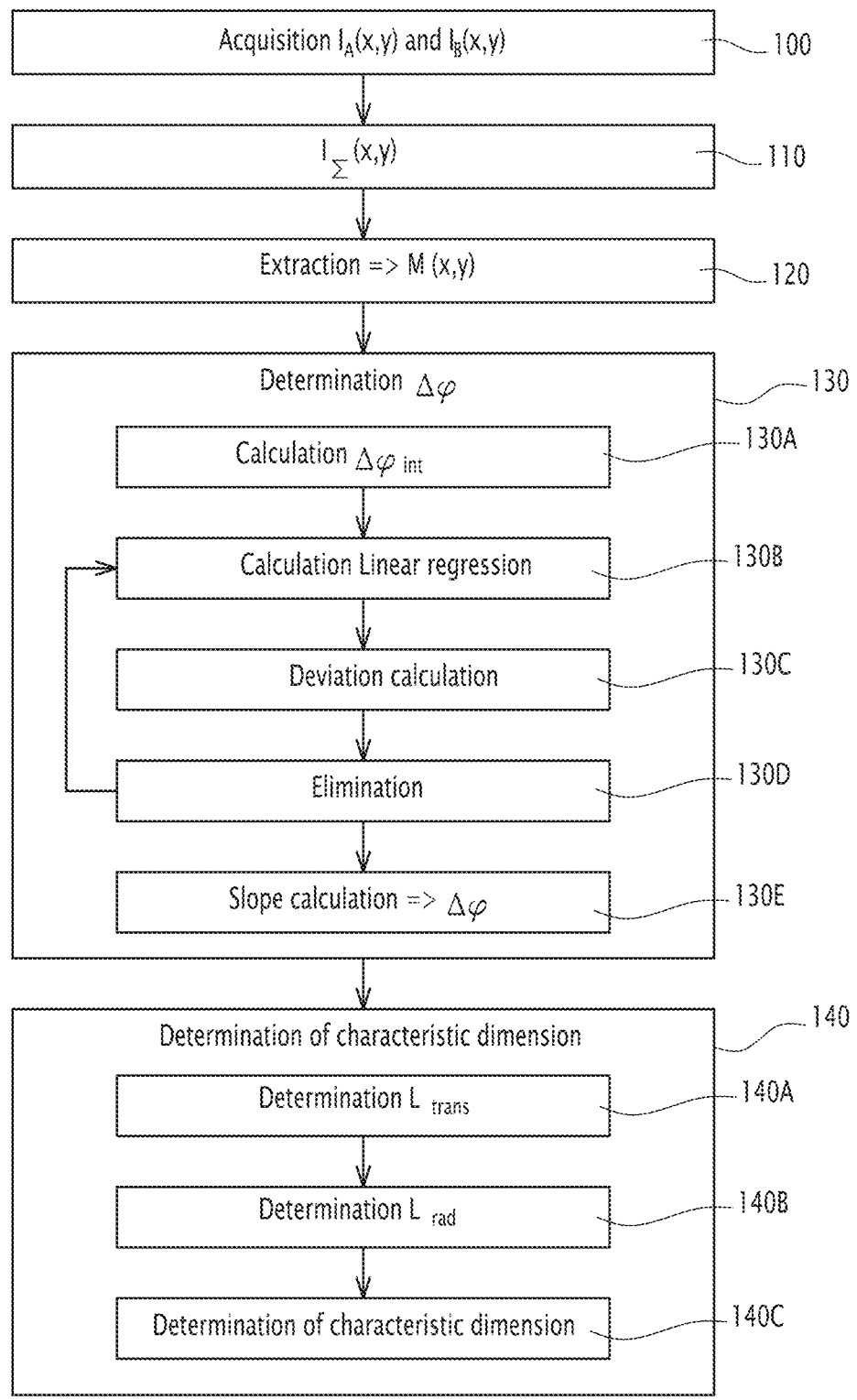

The operation of the electronic system 12 is now described in reference to FIG. 5, which illustrates one example embodiment of a method according to the invention.

The determining method comprises a step 100 for acquiring, for each of the two receiving channels A, B of the radar device 14, a synthetic aperture radar image $I_A(x, y)$, $I_B(x, y)$, also called SAR image, imaging the ship 10 in an environment. The environment is typically the body of water on which the ship 10 is navigating.

The two radar images $I_A(x, y)$, $I_B(x, y)$ result from radar signals coming from a same radar emission and respectively received by each of the two receiving channels A, B of the radar device 14. The two radar images $I_A(x, y)$, $I_B(x, y)$ are acquired at a sampling frequency $f_{ech}$ at a viewing distance D and in a viewing direction V. The viewing distance D and the viewing direction V are illustrated by FIG. 3.

Each radar image $I_A(x, y)$, $I_B(x, y)$ is a matrix of pixels.

Each pixel comprises an amplitude corresponding to the power reflected by a reflector, and coordinates (x, y).

Each column (x-axis) of the matrix of pixels corresponds to a distance between a reflector and the radar device 14. Thus, the x-axis of each radar image $I_A(x, y)$, $I_B(x, y)$, also called distance axis, is a depiction of the viewing direction V between a reflector and the radar device 14 during the acquisition of the radar image $I_A(x, y)$, $I_B(x, y)$. Each row (y-axis) of the matrix of pixels corresponds to a frequency shift caused by the Doppler effect and indicative of a relative speed between the reflector and the radar device 14. The y-axis of each radar image $I_A(x, y)$, $I_B(x, y)$, also called Doppler axis, is a depiction of the relative speed between the reflector and the radar device 14. The distance and frequency shift properties being sampled with predetermined pitches, we will respectively refer to distance box and Doppler box for each coordinate x, y of a pixel.

The determining method comprises a step 110 for the sum of the respective amplitudes of the pixels of the two radar images $I_A(x, y)$, $I_B(x, y)$ to obtain a sum image $I_\Sigma(x, y)$. The pixels of the sum image $I_\Sigma(x, y)$ therefore have an amplitude equal to the sum of the amplitudes of the corresponding pixels of the two radar images $I_A(x, y)$, $I_B(x, y)$ and coordinates (x,y) equal to the coordinates of the corresponding pixels of the two acquired radar images $I_A(x, y)$, $I_B(x, y)$. The sum step 110 is carried out by the calculator 16.

The determining method comprises a step 120 for extracting pixels from the sum image $I_\Sigma(x, y)$ imaging the ship 10 in order to obtain a mask M(x, y) of the ship 10. The extraction step 120 is carried out by the calculator 16.

More specifically, the extraction step 120 consists of classifying the pixels in two categories: a first category encompassing the pixels imaging the reflectors of the ship 10 and a second category encompassing the pixels imaging the environment of the ship 10 (sea clutter) or in which noise appears, such as thermal noise. Then, only the pixels from the first category are extracted to form the mask M(x, y) of the ship 10.

The extraction step 120 is for example carried out using a separation technique by mixing laws. The separation technique by mixing laws consists of hypothesizing that the amplitude of the pixels imaging the ship 10 follows a first law, while the sea clutter follows a second law, different from the first law. According to this technique, a threshold is calculated analytically to separate the two categories of pixels, with a given false alarm probability.

In another example, the extraction step 120 is carried out using an Otsu method seeking to minimize the intra-class variance.

Optionally, the extraction step 120 comprises, before the classification and the extraction of the pixels, the application of processing on the sum image $I_\Sigma(x, y)$ seeking to improve the quality of the sum image $I_\Sigma(x, y)$. The processing for example consists of filtering artifacts related to the backscattering of stem or wake waves or unfocused echoes due to their movement during the acquisition (Doppler effect), or more generally to reduce the noise of the image $I_\Sigma(x, y)$.

Optionally, the extraction step 120 comprises a step for application of morphological operations (closing, expansion or opening) on the extracted pixels.

The determining method comprises a step 130 for determining, via the calculator 16, a range of phase differences $\Delta\varphi$ between the radar signals received by each of the two receiving channels A, B and making it possible to image the ship 10.

The step 130 for determining the phase difference range $\Delta\varphi$ comprises a first sub-step 130A for calculating, for each set of pixels of the mask M(x, y) having the same Doppler box, an intermediate phase difference $\Delta\varphi_{int}$, as a function of the radar signals received by each of the two receiving channels A, B and corresponding to the pixels of said set.

For example, the calculation of each intermediate phase difference $\Delta\varphi_{int}$ comprises:

calculating, for each pixel of the set, the product of the signal received on the first receiving channel A and corresponding to said pixel by the conjugate of the signal received on the second receiving channel B and corresponding to said pixel, calculating the sum of the calculated products, and calculating the argument and, if applicable, the modulus of the calculated sum.

The sum of the calculated products is expressed in mathematical form by the following expression:

$$v(x_{DOP}) = \Sigma_y A(x_{DOP}, y) \cdot \overline{B(x_{DOP}, y)} \tag{1}$$

Where:

$v(x_{DOP})$ designates the sum of the calculated products for a set of pixels of the mask M(x, y) of the same Doppler box $x_{DOP}$, A(x,y) designates the signal received on the first receiving channel A and corresponding to the pixel with coordinates (x, y), B(x,y) designates the signal received on the second receiving channel B and corresponding to the pixel with coordinates (x, y), $\overline{B(x,y)}$ designates the conjugate of the signal B(x, y), and
$\Sigma_y Z(y)$ designates the sum over all of the y (i.e., over all of the distance boxes) of the property Z.

The intermediate phase difference $\Delta \varphi_{int}$ of each set is the argument of the sum of the products calculated for said set, i.e., the argument of $v(x_{DOP})$.

Figure 6:
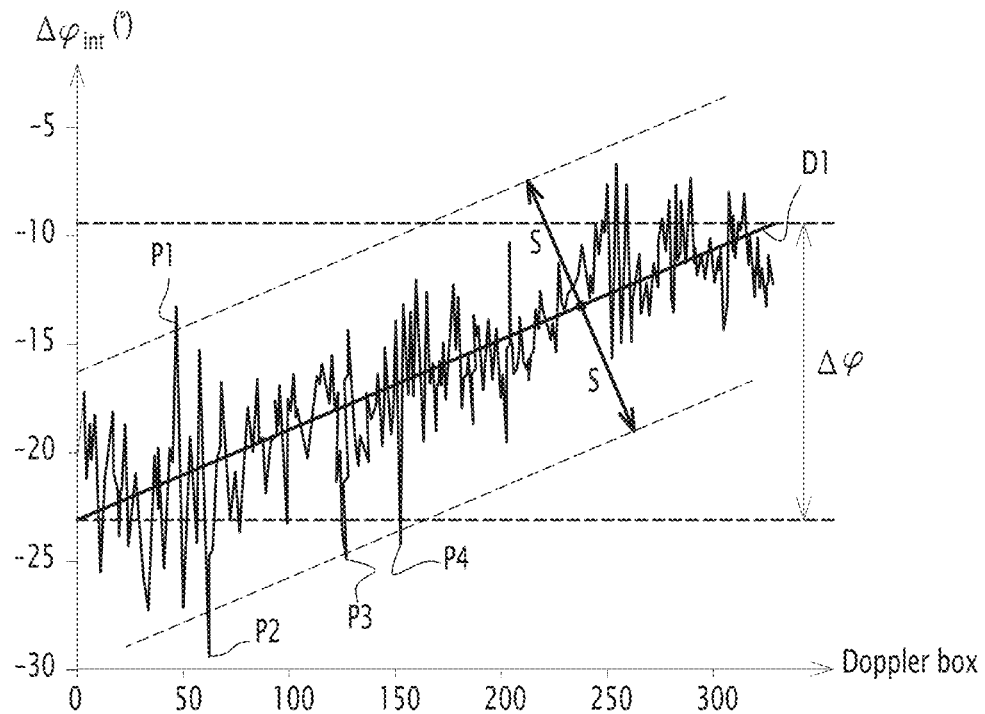

Step 130 for determining the range of phase differences $\Delta \varphi$ also comprises a second sub-step 130B for calculating a linear regression of the intermediate phase differences $\Delta \varphi$ relative to the Doppler boxes of the mask M(x, y). An example of a line D1 from a calculated linear regression is illustrated by FIG. 6.

Advantageously, the intermediate phase differences $\Delta \varphi_{int}$ used to calculate the linear regression are weighted by the corresponding calculated moduli.

Step 130 for determining the phase difference range $\Delta \varphi$ also comprises a third sub-step 130C for calculating the deviation between each intermediate phase difference $\Delta \varphi_{int}$ and the projection of said intermediate phase difference $\Delta \varphi_{int}$ on the line D1 derived from the calculated linear regression.

Step 130 for determining the phase different range $\Delta \varphi$ also comprises a fourth sub-step 130D for eliminating intermediate phase differences $\Delta \varphi_{int}$ whose calculated deviations are strictly above a threshold. An example threshold S is illustrated by FIG. 6. In this example, the points P1, P2, P3 and P4 are eliminated, since the distance of said points relative to the line D1 is strictly above the threshold S.

The threshold for example depends on the desired precision and the signal-to-noise ratio of the ship 10. The threshold is for example set empirically.

The sub-steps for calculating a linear regression 130B, calculating deviations 130C and elimination 130D are repeated for the remaining intermediate phase difference values $\Delta \varphi_{int}$, for example, a predetermined number of times. The predetermined number of times is for example equal to two.

Advantageously, the sub-steps for calculating a linear regression 130B, calculating deviations 130C and elimination 130D are repeated until the deviations of all of the remaining intermediate phase differences $\Delta \varphi_{int}$ are below or equal to the threshold.

Step 130 for determining the phase difference range $\Delta \varphi$ also comprises a fifth sub-step 130E for calculating the gradient, also called slope, of the last calculated linear regression. The phase difference range $\Delta \varphi$ is the product of the slope of the last linear regression calculated by the extension in number of Doppler boxes imaging the ship 10, i.e., the number of pixels of the mask M(x, y) having different Doppler boxes.

In a variant, the fifth sub-step 130E comprises determining two intermediate phase differences $\Delta \varphi_{int}$ corresponding to the extreme points of the line derived from the last calculated linear regression on the range of Doppler boxes of the mask M(x, y). The phase difference range $\Delta \varphi$ is the difference of the two intermediate phase difference is $\Delta \varphi_{int}$ determined for the endpoints.

In a variant, the step for determining the phase difference range $\Delta \varphi$ comprises only the first, second and fifth sub-steps 130A, 130B, 130C, such that the phase difference $\Delta \varphi$ depends on only the calculated linear regression.

The determining method comprises a step 140 for determining, via the calculator 16, a characteristic dimension of the ship 10.

The determining step 140 comprises a first sub-step 140A for determining a transverse dimension $L_{trans}$ of the ship 10 in a transverse direction. The transverse direction is a direction orthogonal to the viewing direction V. An example transverse dimension $L_{trans}$ is illustrated by FIG. 3.

Figure 7:
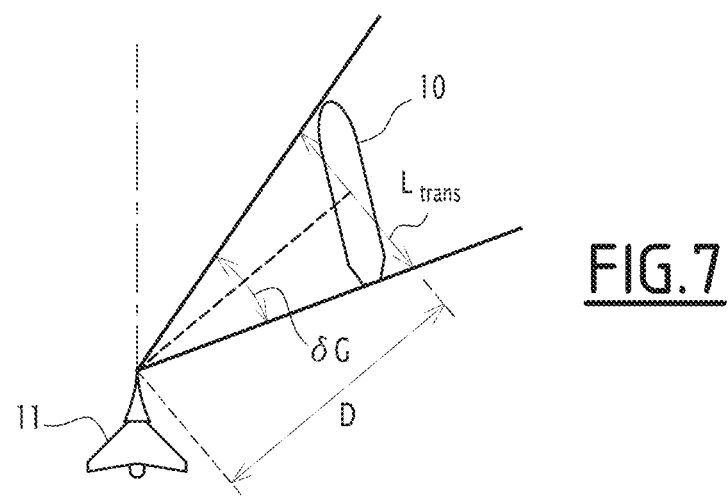

The determination of the transverse dimension $L_{trans}$ of the ship 10 comprises calculating an angular extension $\delta G$ corresponding to the range of phase differences $\Delta \varphi$ determined as a function of the geometry of the radar device 14 and the determined range of phase differences $\Delta \varphi$. An example angular extension is illustrated by FIG. 7.

For example, for a square antenna with non-weighted side L, the angular extension $\delta G$ is given by the following expression:

$$\delta G = \frac{\theta_{3\,dB} \cdot \Delta \phi}{0.89 \cdot \pi} \qquad (2)$$

Where:

$\theta_{3\,dB}$ is the value of the opening of the antenna for which the gain has decreased by 3 dB relative to the maximum antenna gain, in the case of a square antenna with non-weighted side $$L\ \theta_{3\,dB} = 0.89 \cdot \frac{\lambda}{L},$$

$\lambda$ is the wavelength of the radar signal, and $\Delta \phi$ is the phase difference range between the radar signals received by each of the two receiving channels A and B.

Then, the transverse dimension $L_{trans}$ is carried out as a function of the calculated angular extension $\delta G$ and the viewing distance D. More specifically, the transverse dimension $L_{trans}$ is the product of the angular extension $\delta G$ and the viewing distance D, given by the following expression:

$$L_{trans} = D \cdot \delta G \qquad (3)$$

The determining step 140 comprises a second sub-step 140B for determining a radial dimension $L_{rad}$ of the ship 10 in a radial direction. The radial direction is the viewing direction V. An example radial dimension $L_{rad}$ is illustrated by FIG. 3.

The determination of the radial dimension $L_{rad}$ of the ship 10 comprises calculating the distance represented by each distance box as a function of the sampling frequency $f_{ech}$. For example, the distance $L_D$ represented by each distance box is given by the following expression:

$$L_D = \frac{c}{2 \cdot f_{ech}} \qquad (4)$$

Where:

c is the propagation speed of the radar signal.

Then, the number of pixels of the mask M(x, y) having different distance boxes is determined.

The radial dimension $L_{rad}$ is the product of the distance $L_D$ represented by each distance box and the number of determined pixels.

The determining step 140 comprises a third sub-step 140C for determining the characteristic dimension as a function of the determined radial dimension $L_{rad}$ and transverse dimension $L_{trans}$.

For example, the characteristic dimension is given by the following expression:

$$\mathcal{L} = \sqrt{L_{rad}^2 + L_{trans}^2}$$

$$\text{(5)}$$

Where:

$\hat{L}$ designates an estimate of the characteristic dimension, and $\sqrt{X}$ a designates the square root of X function.

Thus, the method according to the invention makes it possible, by calculating the phase range difference Δφ between the signals received on each receiving channel A, B, to obtain characteristic dimensions not affected by the movement of the ship 10.

The method according to the invention can in particular be used in addition to a method of the state of the art, consisting of determining both the distance represented by each pixel on the distance axis and the distance represented by each pixel on the Doppler axis, or to check an estimate done by such a method of the state of the art. Thus, when the results obtained at the end of the two methods are close, the result of the method of the state of the art is validated, this method having fewer approximations than the inventive method. However, when the results obtained at the end of the two methods are significantly different, it is presumed that the ship 10 had its own movement, and the result of the inventive method is kept.

The method according to the invention therefore makes it possible to reliably determine the characteristic dimensions of a ship 10, such as the length or the width of the ship 10, independently of any movements of said ship 10.

The invention claimed is:

1. A method for determining at least one characteristic dimension of a ship, the method being implemented by an electronic system including a radar device and a calculator, the radar device including at least two separate channels configured to receive a radar signal, the method comprising:

acquiring, for each of the two receiving channels of the radar device, a synthetic aperture radar image imaging the ship in an environment, the two radar images resulting from radar signals coming from a same radar emission signal and respectively received by each of the two receiving channels of the radar device, each of the radar images being a matrix of pixels, each of the pixels having an amplitude and coordinates that are a distance box and a doppler box, summing the respective amplitudes of the pixels of the two radar images to obtain a sum image;

extracting pixels from the sum image imaging the ship to obtain a mask of the ship;

determining a range of phase differences between the radar signals received by each of the two receiving channels, the determining the range of the phase differences comprising calculating, for each set of pixels of the mask having the same doppler box, an intermediate phase difference as a function of the radar signals received by each of the two receiving channels and corresponding to the pixels of said set, and obtaining the range of phase differences as a function of the calculated intermediate phase differences; and determining the at least one characteristic dimension of the ship as a function of the mask of the ship and the determined range of the phase differences, wherein, for each of the set of pixels of the mask having the same doppler box, the calculating the intermediate phase difference comprises:

calculating, for each of the pixels of the set, a product of the signal received on the first receiving channel and corresponding to said pixel by a conjugate of the signal received on the second receiving channel and corresponding to said pixel, and calculating a sum of the calculated products, the intermediate phase difference for said set being an argument of the calculated sum.

2. The method according to claim 1, wherein the radar device has a geometry, the two radar images being acquired at a sampling frequency, at a viewing distance, and in a viewing direction, the determining the at least one characteristic dimension comprising:

determining a transverse dimension of the ship in a transverse direction as a function of the mask of the ship, the determined range of the phase differences, the viewing distance and the geometry of the radar device, the transverse direction being a direction orthogonal to the viewing direction, determining a radial dimension of the ship in a radial direction as a function of the mask of the ship, and the sampling frequency, the radial direction being the viewing direction, and determining the at least one characteristic dimension as a function of the determined radial dimension and the determined transverse dimension.

3. The method according to claim 2, wherein the determining the transverse dimension of the ship comprises:

calculating an angular extension corresponding to the range of the phase differences determined as a function of the geometry of the radar device and the determined range of the phase differences, and calculating the transverse dimension as a function of the angular extension that is calculated and the viewing direction.

4. The method according to claim 1, wherein the determining the range of the phase differences comprises calculating a linear regression of the intermediate phase differences relative to the doppler boxes of the mask.

5. The method according to claim 1, wherein the calculating the intermediate phase differences further comprises, for each of the set of pixels of the mask having the same doppler box, calculating a modulus of the calculated sum, the intermediate phase differences used to calculate the linear regression being weighted by the corresponding calculated moduli.

6. The method according to claim 4, wherein the determining the phase difference range further comprises:

calculating a deviation between each intermediate phase difference and a projection of said intermediate phase difference on a line derived from the linear regression that is calculated, and eliminating some of the intermediate phase differences that have deviations that are calculated which are strictly above a threshold, the calculating the linear regression, the calculating the deviations, and the eliminating being repeated for remaining intermediate phase difference values that are not eliminated intermediate phase differences, the range of the phase differences being obtained as a function of a slope of a last calculated linear regression.

7. The method according to claim 1, wherein the characteristic dimension of the ship is the length or the width of the ship.

8. An electronic system for determining the at least one characteristic dimension of a ship according to the method of claim 1, the electronic system comprising:

the radar device comprising the at least two separate channels configured to receive the radar signal; and the calculator, the electronic system being able to implement a determining method according to claim 1.

9. An aircraft comprising:
the electronic determining system according to claim 8.

10. The method according to claim 4, wherein the calculating the intermediate phase differences further comprises, for each of the set of pixels of the mask having the same doppler box, calculating the modulus of the calculated sum, the intermediate phase differences used to calculate the linear regression being weighted by the corresponding calculated moduli.

\* \* \* \* \*